United States Patent [19]
Nakamura

[11] Patent Number: 5,979,438
[45] Date of Patent: Nov. 9, 1999

[54] SUNLIGHT COLLECTING SYSTEM

[75] Inventor: Katsushige Nakamura, Tokyo, Japan

[73] Assignee: Mitaka Kohki Co., Ltd., Tokyo, Japan

[21] Appl. No.: 09/089,579

[22] Filed: Jun. 3, 1998

[30] Foreign Application Priority Data

Oct. 15, 1997 [JP] Japan ............................ 9-282052

[51] Int. Cl.$^6$ ........................................ F24J 2/02
[52] U.S. Cl. .................. 126/680; 126/685; 126/691; 126/578
[58] Field of Search ................... 126/680, 681, 126/684–690, 573, 574, 575, 578

[56] References Cited

U.S. PATENT DOCUMENTS

| | | | |
|---|---|---|---|
| 3,613,659 | 10/1971 | Phillips | 126/681 |
| 4,041,307 | 8/1977 | Napoli et al. | 126/680 |
| 4,137,897 | 2/1979 | Moore | 126/680 |
| 4,276,872 | 7/1981 | Blake | 126/680 |
| 5,578,140 | 11/1996 | Yogev et al. | 126/685 |

FOREIGN PATENT DOCUMENTS

| | | |
|---|---|---|
| 52-10931 | 1/1977 | Japan . |
| 56-102645 | 8/1981 | Japan . |
| 56-102646 | 8/1981 | Japan . |
| 57-63504 | 4/1982 | Japan . |
| 57-120809 | 7/1982 | Japan . |
| 59-74460 | 4/1984 | Japan . |

*Primary Examiner*—James C. Yeung
*Attorney, Agent, or Firm*—Jordan and Hamburg LLP

[57] ABSTRACT

A sunlight collecting system comprises an oval mirror 1 directed downwardly and provided at a given elevation, and a plurality of heliostats 5 arranged on the ground about the oval mirror 1, each heliostat having a concave mirror 13 for reflecting and converging sunlight L onto the oval mirror 1. The sunlight L reflected on the concave mirror 13 of each heliostat 5 is focused to a point at a first focal point of the oval mirror 1, and converged to a second focal point of the oval mirror 1 after reflected by the oval mirror 1.

12 Claims, 9 Drawing Sheets

SUNLIGHT COLLECTING SYSTEM

BACKGROUND OF THE INVENTION

1. Field of the Invention

The present invention relates to a sunlight collecting system for exploiting the radiation of sunlight as energy.

2. Prior Art

The solar energy has been focused quite long for use as clean, environment-friendly energy. For utilizing the solar energy in practice, there has been proposed a method in which sunlight is received and collected as thermal energy which is in turn converted to electricity. Such a system is provided, for example, comprising a heat exchanger mounted to the top of a power tower and a multiplicity of reflective mirrors (on heliostats) located about the tower, in which intensities of sunlight reflected on the reflective mirrors are directed to the heat exchanger where they are stimulated as the thermal energy to generate electrical energy with a power generator (See Japanese Patent Laid-open Publication No. SHO57-63504 for heliostat technology).

However, since it is essential to mount a heat exchanger to the top of a power tower in the conventional sunlight collecting systems, it is difficult and impractical to build such a tall tower.

The present invention is directed towards overcoming the drawback of the prior art, and its object is to provide an improved sunlight collecting system which eliminates a necessity of building towers provided at the top thereof with a heat exchanger.

SUMMARY OF THE INVENTION

As defined in claim 1, a sunlight collecting system comprises an oval mirror directed downwardly and provided at a given elevation, and a plurality of heliostats arranged on the ground about the oval mirror, each heliostat having a concave mirror for reflecting and converging sunlight onto the oval mirror, wherein the sunlight reflected on the concave mirror of each heliostat is focused to a point at a first focal point of the oval mirror and after reflected by the oval mirror, converged to a second focal point of the oval mirror.

According to the system defined in claim 1, the sunlight radiated upwardly from the heliostats is reflected down by the oval mirror, so that the heat exchanger can be located on the ground and there is no need of building a conventional power tower on the top of which a heat exchanger is mounted. Also, the concave mirror of the heliostat is of a positive type for converging the reflected sunlight and permits the oval mirror to be a small size. Moreover, the sunlight reflected on the concave mirror of each heliostat is focused to a point at the first focal point of the oval mirror and after reflected by the oval mirror, is converged to the second focal point of the oval mirror. This allows the reflected sunlight to be concentrated in a small angle of convergence at high efficiency.

As defined in claim 2, the system further comprises a tubular condenser mirror located adjacent to the second focal point, and of which lower opening is smaller than its upper opening.

According to the system defined in claim 2, the tubular condenser mirror located adjacent to the second focal point, and of which lower opening is smaller than its upper opening, thereby converging the sunlight at higher efficiency.

As defined in claim 3, the concave mirrors of the heliostats are elevated higher as spaced farther from the oval mirror.

According to the system defined in claim 3, the concave mirrors of the heliostats which are elevated higher as spaced farther from the oval mirror minimizes the loss of sunlight caused by shading one from the other.

As defined in claim 5, the heliostat includes a drive mechanism for rotating the concave mirror in both altitude and azimuth directions and a sensor mechanism. The sensor mechanism comprises a direction sensor unit incorporating two separate, built-in optical sensors for the azimuth direction and an altitude sensor unit incorporating two separate, built-in optical sensors for the altitude direction. The direction sensor unit and the altitude sensor unit are joined to each other in an L shape across the optical axis extending from the concave mirror to the first focal point of the oval mirror. The drive mechanism is controlled by signals from the sensor mechanism for constantly directing the sunlight reflected on the concave mirror to the first focal point of the oval mirror.

According to the system defined in claim 5, the drive mechanism is controlled by the signals from the sensor mechanism for constantly directing the sunlight reflected on the concave mirror of each heliostat to the first focal point of the oval mirror. When the sunlight is shifted with time, its reflection can constantly be directed from the concave mirror of each heliostat to the first focal point of the oval mirror.

As defined in claim 9, the direction and altitude sensors in the sensor mechanism are formed as thin as possible in relation to the sunlight.

According to the system defined in claim 9, the direction and altitude sensors in the sensor mechanism which are formed as thin as possible in relation to the sunlight permit the sunlight to run to behind the two sensors (on the concave mirror side of the sensor mechanism) as diffuse more or less. Hence, the transmission of sunlight will be less interrupted by the sensor mechanism.

It would be noted that the present invention is not limited to the above explanation and other objects, features, and advantages of the present invention will be more apparent from the following detailed description in conjunction with the accompanying drawings. It is understood that possible modifications not departing from the spirit of the present invention reside in the scope of the present invention.

PREFERRED EMBODIMENT

One preferred embodiment of the present invention will be described in more detail referring to FIGS. 1 to 12. The numeral 1 indicates an oval mirror which is mounted directing downwardly to three support towers 2 at a predetermined height. The oval mirror 1 has two focal points, a first focal point f1 and a second focal point f2 therebelow. A heat exchanger facilities 3 for converting the radiation of sunlight L into thermal energy is provided beneath the oval mirror 1. A cylindrical condenser mirror 4 is directly mounted on the top of the heat exchanger facilities 3. There are a multiplicity of heliostats 5 arranged on the ground about the heat exchanger facilities 3 to surround the oval mirror 1.

Figure 6:
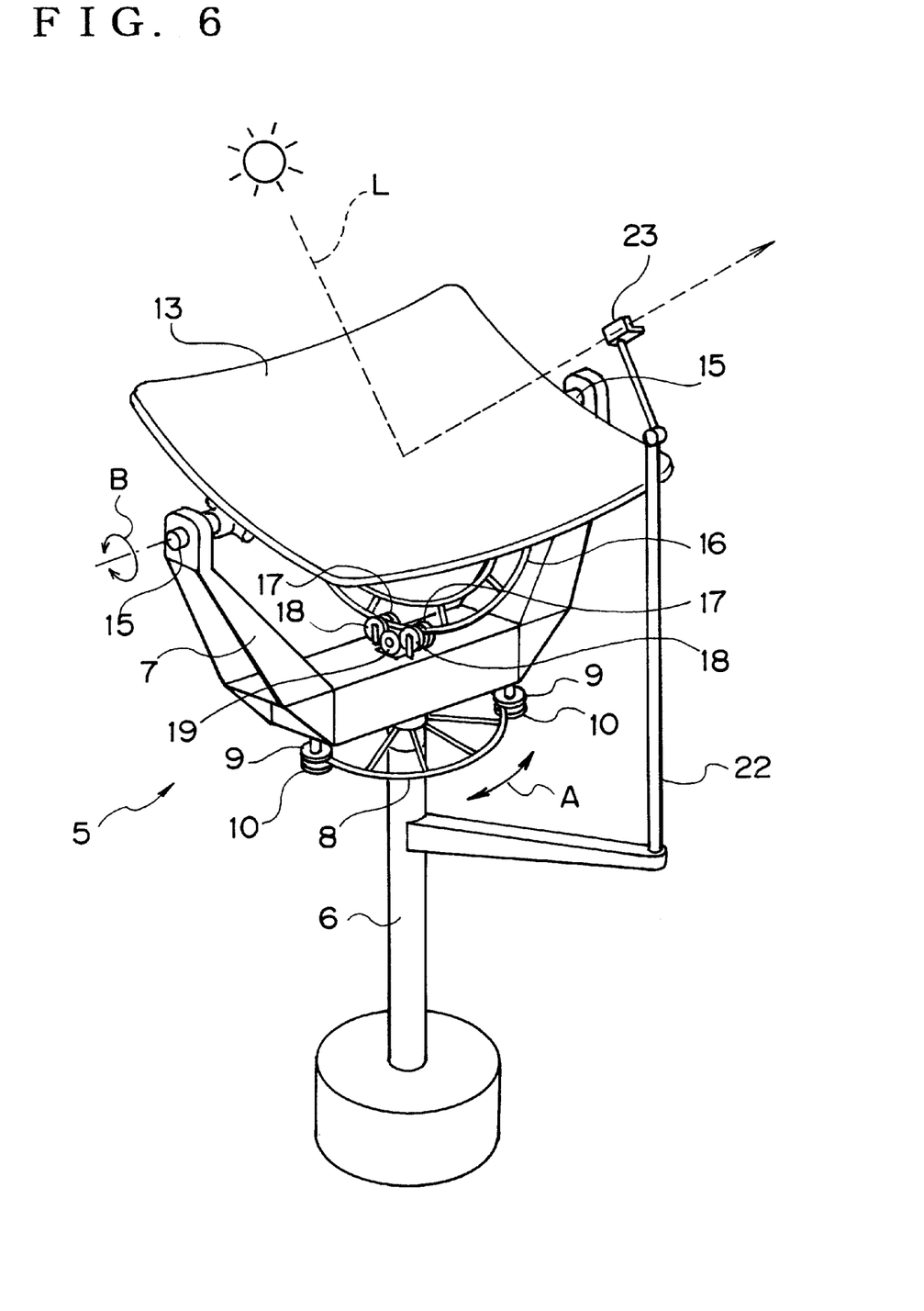
FIG. 6 is a perspective view of a heliostat.
Figure 7:
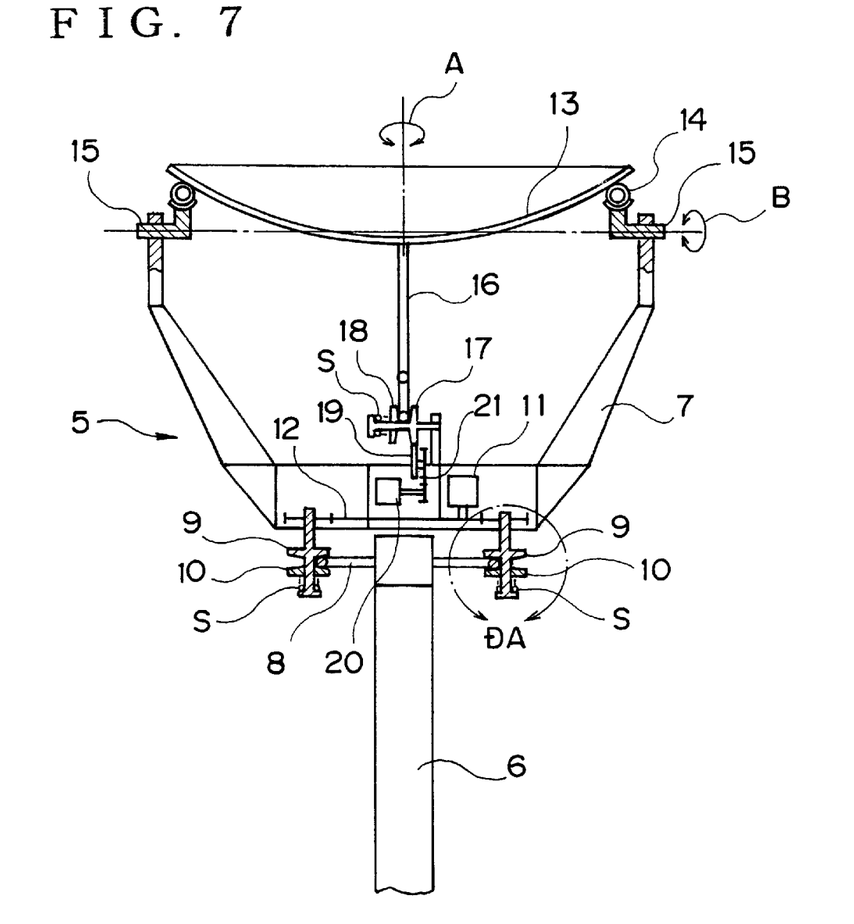
FIG. 7 is a partially cross sectional side view of the heliostat seen along its fork.
Figure 8:
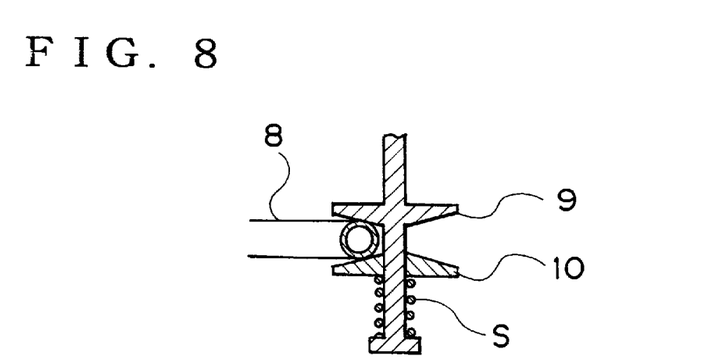
FIG. 8 is an enlarged cross sectional view taken along the line D-A of FIG. 7.
Figure 9:
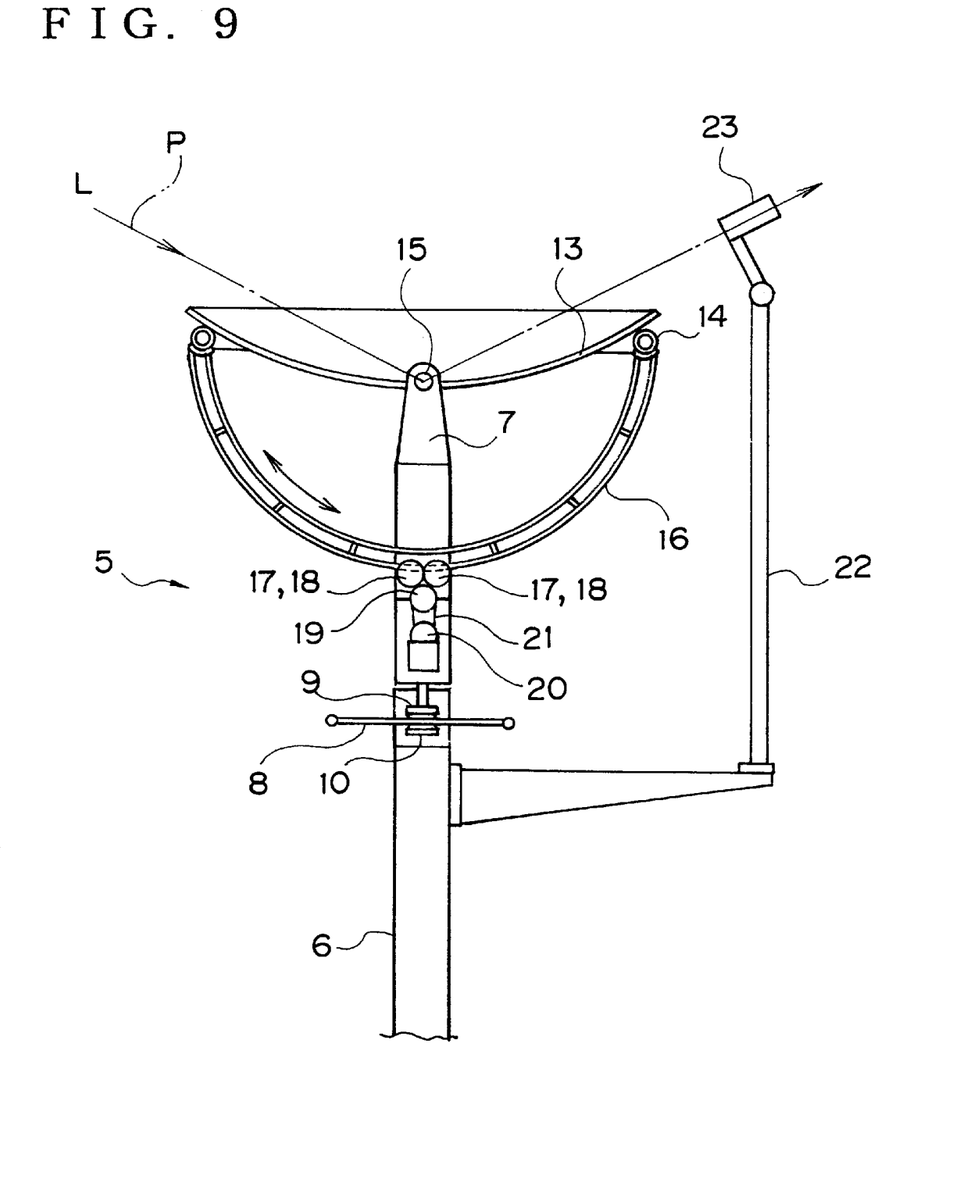
FIG. 9 is a partially cross sectional side view of the heliostat seen at a right angle to its fork.

The heliostat 5 has a fork 7 mounted to the uppermost of a column support 6 thereof for movement in an azimuth direction (denoted by a double-headed arrow A in FIG. 6). An annular link 8 is mounted about the column support 6. A pair of rotary pulleys 9 are mounted directing downwardly to the fork 7 in opposite relationship about the column support 6. Each rotary pulley 9 is associated with a holding pulley 10 which remains urged by a spring S. The annular link 8 is sandwiched between the rotary pulleys 9 and the holding pulleys 10. A timing belt 12 is mounted between the rotary pulleys 9 and driven by a motor 11 which serves as a drive mechanism. This allows the pair of pulleys 9 to be rotated in a combination. As the rotary pulleys 9 rotate, the fork 7 is turned in azimuth directions. Since the annular link 8 is held down with the holding pulleys 10, it hardly slips on the rotary pulleys 9.

The fork 7 is provided at the upper end thereof a concave mirror 13 for movement in an altitude direction (denoted by a double-headed arrow B in FIG. 6). The concave mirror 13 has a four-sided (or a circular) configuration and its surface is spherical (or parabolic). The concave mirror 13 is fixed on the back with an annular tube 14. The annular tube 14 is mounted on a pair of pivotal axes 15 which are located opposite to each other for pivotal movement on the upper ends of the fork 7 so that the concave mirror 13 is turned in the altitude direction.

Also, an arcuate link 16 is mounted at two opposite ends to the annular tube 14 on the back of the concave mirror 13 as spaced by 90 degrees from the pivotal axes 15. Two pairs of rotary pulleys 17 and holding pulleys 18 urged by springs S are provided on the lowermost center of the fork 7. The arcuate link 16 is sandwiched between the rotary pulleys 17 and the holding pulleys 18. Provided at a position intermediate the rotary pulleys 17 is a drive pulley 19 which is directly engaged with both the rotary pulleys 17 and driven by a timing belt 21 connected to a motor 20 which serves as a drive mechanism. As the motor 20 rotates, the concave mirror 13 can be turned with the pivotal axes 15 in the altitude direction.

It should be noted that the concave mirrors 13 of the heliostats 5 as structured above are positioned at higher levels in proportion to their distance from the oval mirror 1. This will minimize the loss of sunlight caused by shading the concave mirrors 13 one from the other.

Figure 10:
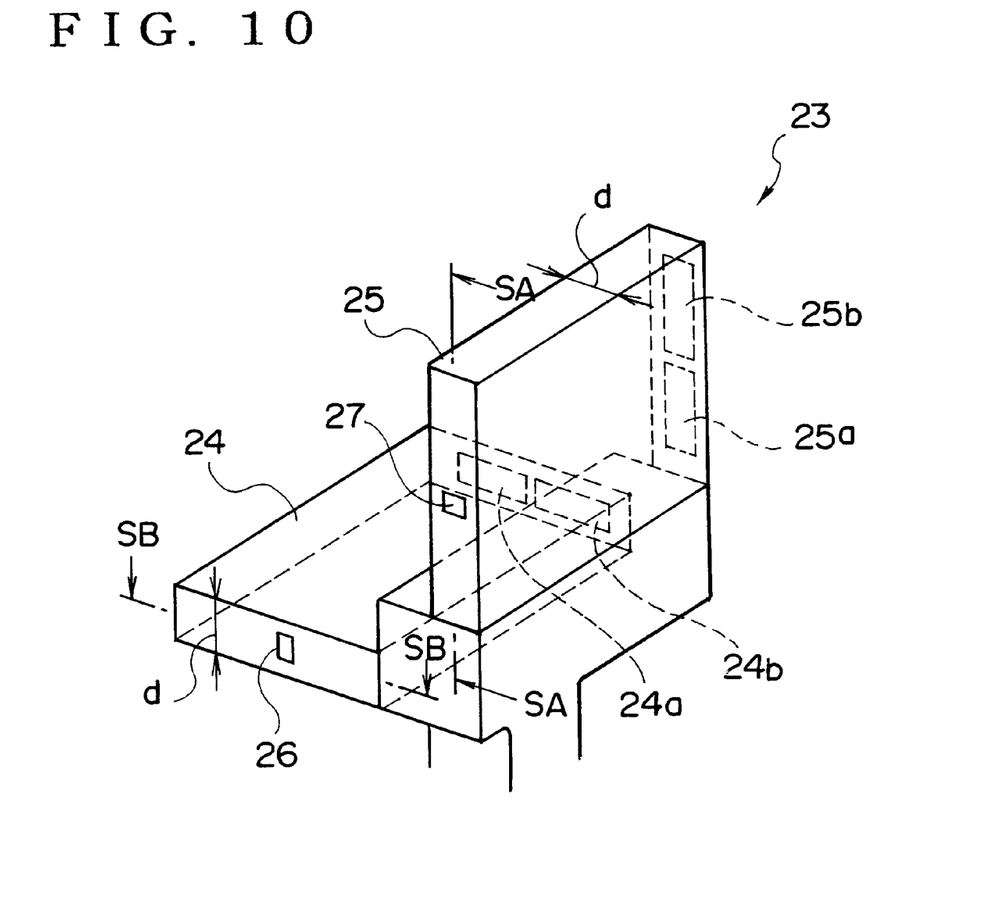
FIG. 10 is a perspective view of a sensor mechanism.

A sensor mechanism 23 is fixedly mounted by an arm 22 to the column support 6. As shown in FIG. 10, the sensor mechanism 23 comprises a direction sensor unit 24 including two separate, built-in optical sensors 24a and 24b and an altitude sensor unit 25 including two separate, built-in optical sensors 25a and 25b. Both the sensor units 24 and 25 are joined to each other in an L shape across an optical axis P which extends from the concave mirror 13 to the first focal point f1 of the oval mirror 1.

Figure 11:
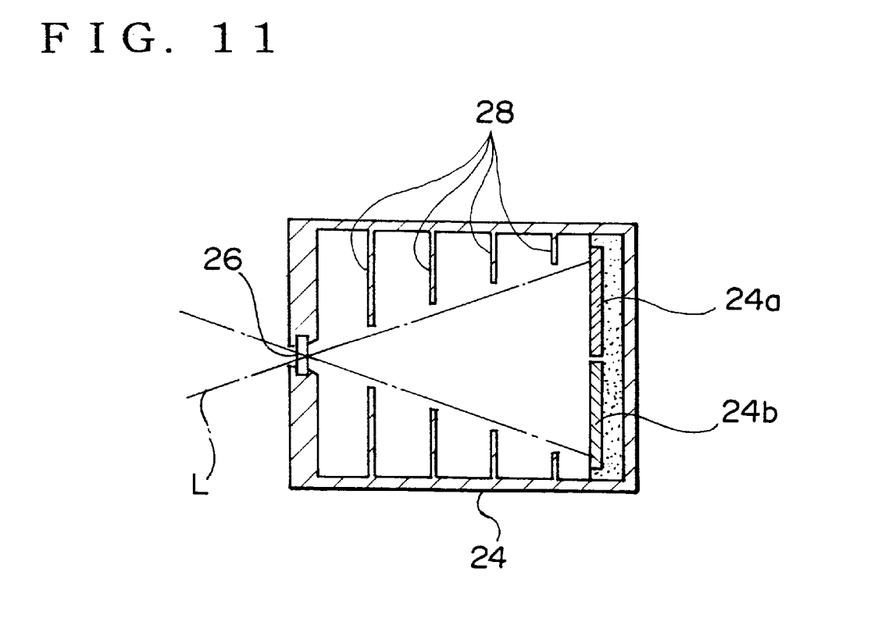
FIG. 11 is a cross sectional view taken along the line SA—SA of FIG. 10.
Figure 12:
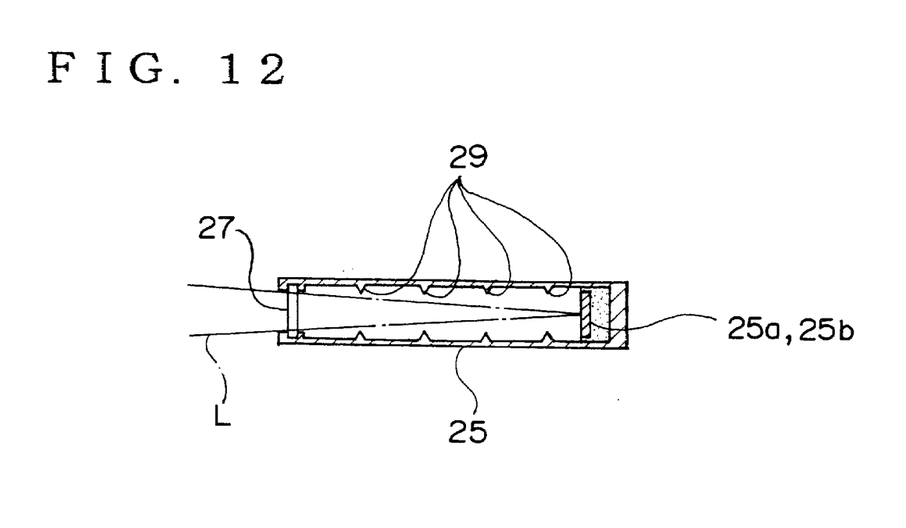
FIG. 12 is a cross sectional view taken along the line SB—SB of FIG. 11.

The direction sensor unit 24 and the altitude sensor unit 25 have windows 26 and 27 provided at the front sides thereof respectively and covered with transparent glass sheets. Also, a plurality of light-shielding walls 28 and 29 are provided in the sensor units 24 and 25 respectively for prevention of irregular reflection of light as aligned in a row along the path of sunlight L which extends across the windows 26 and 27. The directional sensor unit 24 and the altitude sensor unit 25 are movable in synchronism with the motors 11 and 20. For example, when the receipt of sunlight is balanced among the separate optical sensors 24a, 24b, 25a, and 25b, the motors 11 and 20 receive no drive signal and remain deactuated. When the balance is collapsed, the sensor mechanism 23 produces and delivers drive signals to the motors 11 and 20 for directing the sunlight L received by the concave mirror 13 to the first focal point f1 of the oval mirror 1. More specifically, although the radiation of sunlight is shifted, its path L from the concave mirror 13 of each heliostat 5 to the first focal point f1 of the oval mirror 1 remains unchanged.

The thickness d of each direction sensor unit 24 and the altitude sensor unit 25 is determined as thin as it can be to allow transmission of sunlight L to the concave mirror 13 will be less interrupted by the sensor mechanism 23. It is because that since the sunlight L is not parallel but slightly diverged (through substantially an angle of 0.5 degree), the smaller the thickness d of the sensor units 24 and 25, the more the sunlight L is allowed to run to behind both the sensor units 24 and 25 (on their concave mirror 13 side).

Figure 3:
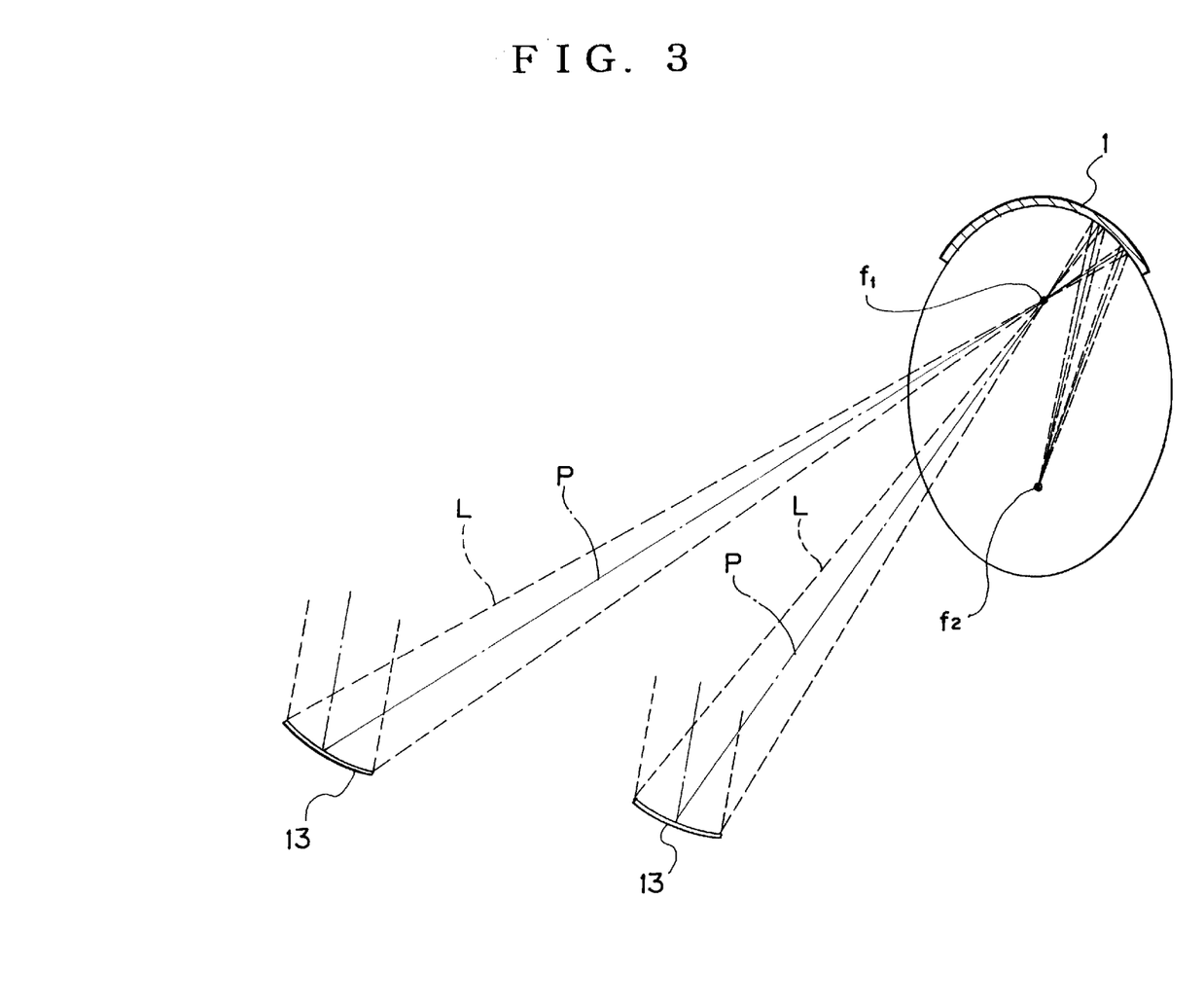
FIG. 3 is an explanatory view showing reflection of sunlight on oval mirrors.
Figure 4:
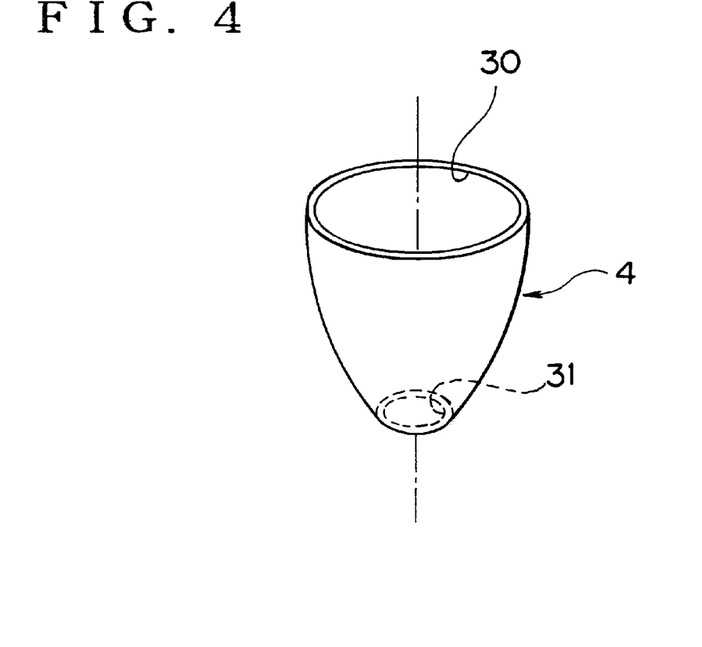
FIG. 4 is a perspective view of a condenser mirror.
Figure 5:
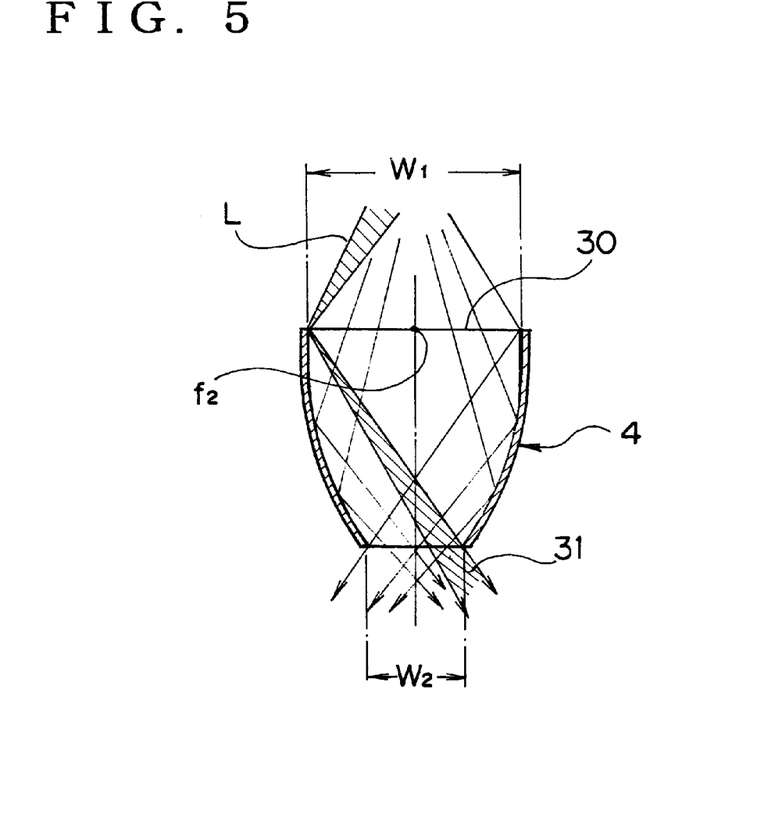
FIG. 5 is a cross sectional view of the condenser mirror.

The reflected sunlight L on the concave mirror 13 of each heliostat 5 is directed to the first focal point f1 of the oval mirror 1 and then reflected on the oval mirror 1 to focus on the second focal point f2 beneath the oval mirror 1. Because the sunlight L focused on the second focal point f2 falls with a certain width, the condenser mirror 4 is provided beneath the second focal point f2 for reducing the width. The condenser mirror 4 has a tubular configuration with a width W1 of an upper opening or entrance 30 being greater than that W2 of a lower opening or exit 31. This configuration allows the sunlight L to be reduced in the width from W1 at the second focal point f2 to W2 at the exit of the condenser mirror 4 and thus can be converged at higher efficiency.

It is preferable in view of pertinent loss if the sunlight is reflected one time on the inner surface of the condenser mirror 4 before departing from the lower opening 31 as shown in FIG. 5. However, the lower opening 31 may be further decreased in the width allowing the reflection of the sunlight to repeat twice or more. The sunlight L departing from the lower opening 31 is directed to the heat exchanger facilities 3 to be converted to thermal energy for generating electricity.

According to the embodiment, the sunlight L collected from the concave mirrors of the heliostats 5 is directed by the oval mirror 1 towards the ground. Since the heat exchanger facilities 3 is located on the ground, there is no need of constructing a conventional power tower which has a heat exchanger mounted to the top thereof.

Figure 1:
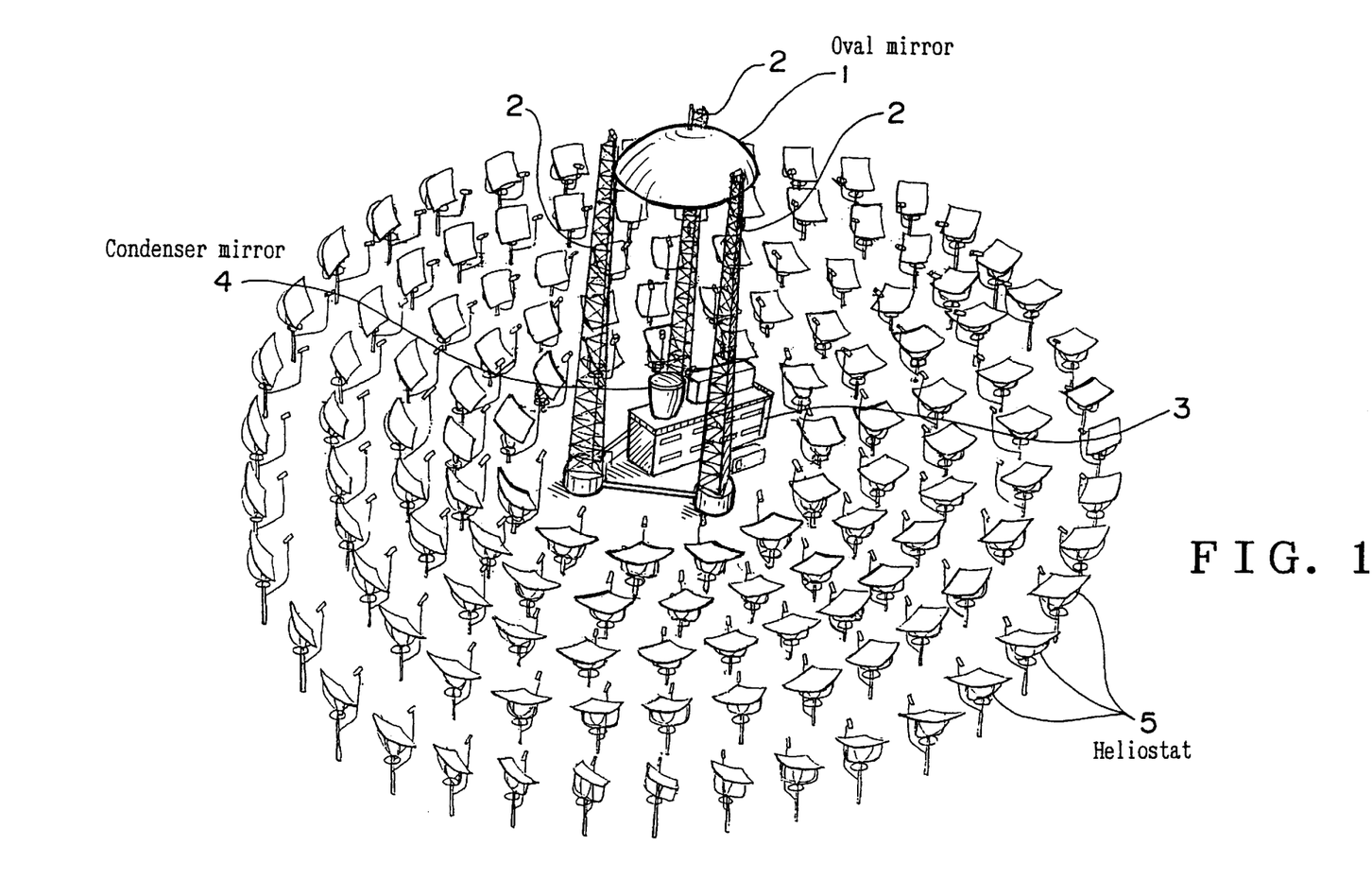
FIG. 1 is an overall perspective view of a sunlight collecting system showing one embodiment of the present invention.
Figure 2:
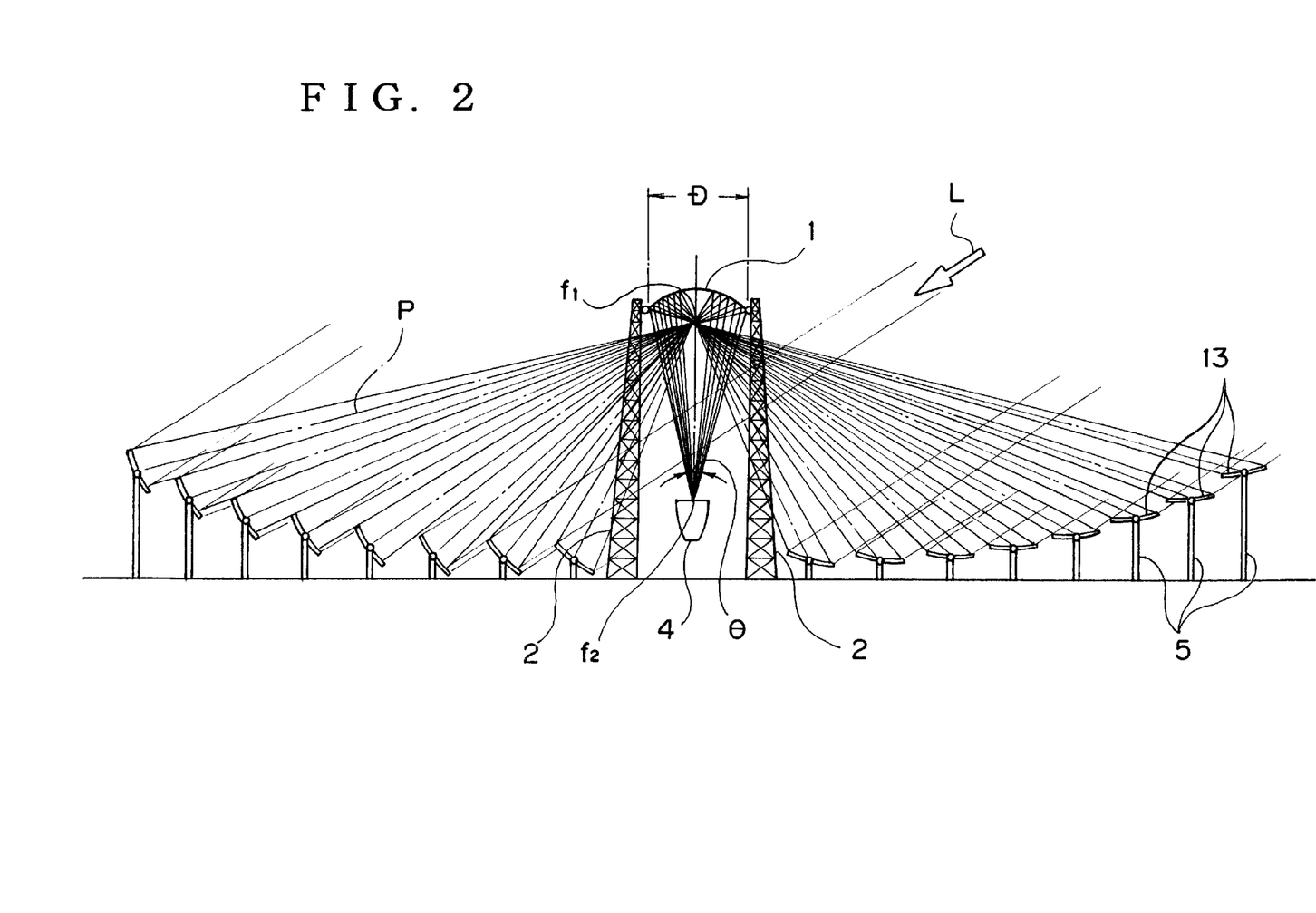
FIG. 2 is an overall side view of the sunlight collecting system.

It is also advantageous the concave mirror 13 of each heliostat 5 produces convergence of the sunlight L and thus permits the oval mirror 1 to be small sized D (FIG. 2). Therefore, the oval mirror 1 can be readily installed on the support towers 2.

Moreover, since the sunlight L reflected on the concave mirror 13 of each heliostat 5 is directed to the first focal point f1 of the oval mirror 1 and then focused to the second focal point f2 when having been reflected by the oval mirror 1, the sunlight L can fall on the second focal point f2 at a small angle of convergence θ for efficient light condensing.

The condenser mirror 4 located adjacent to the second focal point f2 of the oval mirror 1 allows the sunlight L to be converged at a higher efficiency.

Although the movement in the altitude direction of the concave mirror 13 is controlled by the arcuate link 16 and the rotary pulleys 17 in the embodiment, it may be controlled by any other appropriate power transmitting means including chains and timing belts.

According to the system defined in claim 1, the sunlight radiated upwardly from the heliostats is reflected down by the oval mirror. This allows the heat exchanger to be located on the ground and there is no need of building a conventional power tower on the top of which a heat exchanger is mounted. Also, the concave mirror of the heliostat is of a positive type for converging the reflected sunlight and permits the oval mirror to be a size. Moreover, the sunlight reflected on the concave mirror of each heliostat is focused to a point at the first focal point of the oval mirror and after reflected by the oval mirror, is converged to the second focal point of the oval mirror. This allows the reflected sunlight to be concentrated in a small angle of convergence at high efficiency.

According to the system defined in claim 2, the tubular condenser mirror in which the upper opening is smaller in size than the lower opening is located adjacent to the oval mirror hence converging the sunlight at higher efficiency.

According to the system defined in claim 3, the concave mirrors of the heliostats which are elevated higher as spaced farther from the oval mirror reduces the loss of sunlight caused by shading one from the other.

According to the system defined in claim 5, the drive mechanism is controlled by the signals from the sensor mechanism for constantly directing the sunlight reflected on the concave mirror of each heliostat to the first focal point of the oval mirror. When the sunlight is shifted with time, its reflection can constantly be directed from the concave mirror of each heliostat to the first focal point of the oval mirror.

According to the system defined in claim 9, the direction and altitude sensors in the sensor mechanism which are arranged as thin as possible in relation to the sunlight permit the sunlight to run to behind the two sensors (on the concave mirror side of the sensor mechanism). Hence, the transmission of sunlight will be less interrupted by the sensor mechanism.

What is claimed is:

1. A sunlight collecting system, comprising:
   an oval mirror directed downwardly and provided at a given elevation; and
   a plurality of heliostats arranged on the ground about the oval mirror, each heliostat having a concave mirror for reflecting and converging sunlight onto the oval mirror, wherein the sunlight reflected on the concave mirror of each heliostat is focused to a point at a first focal point of the oval mirror, and converged to a second focal point of the oval mirror after being reflected by the oval mirror.

2. A sunlight collecting system according to claim 1, further comprising a tubular condenser mirror located adjacent to the second focal point, said tubular condenser mirror including a lower opening and an upper opening, said lower opening being smaller than said upper opening.

3. A sunlight collecting system according to claim 1, wherein the concave mirrors of the heliostats are elevated higher as spaced farther from the oval mirror.

4. A sunlight collecting system according to claim 2, wherein the concave mirrors of the heliostats are elevated higher as spaced farther from the oval mirror.

5. A sunlight collecting system according to claim 1, wherein each heliostat includes: a drive mechanism for rotating the concave mirror in both altitude and azimuth directions; and a sensor mechanism which comprises a direction sensor unit and an altitude sensor unit, said direction sensor unit incorporating two separate, built-in optical sensors for the azimuth direction, and said altitude sensor unit incorporating two separate, built-in optical sensors for the altitude direction which both are joined to each other in an L shape across the optical axis extending from the concave mirror to the first focal point of the oval mirror, wherein the drive mechanism is controlled by signals from the sensor mechanism for constantly directing the sunlight reflected on the concave mirror to the first focal point of the oval mirror.

6. A sunlight collecting system according to claim 2, wherein each heliostat includes: a drive mechanism for rotating the concave mirror in both altitude and azimuth directions; and a sensor mechanism which comprises a direction sensor unit and an altitude sensor unit, said direction sensor unit incorporating two separate, built-in optical sensors for the azimuth direction, and said altitude sensor unit incorporating two separate, built-in optical sensors for the altitude direction which both are joined to each other in an L shape across the optical axis extending from the concave mirror to the first focal point of the oval mirror, wherein the drive mechanism is controlled by signals from the sensor mechanism for constantly directing the sunlight reflected on the concave mirror to the first focal point of the oval mirror.

7. A sunlight collecting system according to claim 3, wherein each heliostat includes: a drive mechanism for rotating the concave mirror in both altitude and azimuth directions; and a sensor mechanism which comprises a direction sensor unit and an altitude sensor unit, said direction sensor unit incorporating two separate, built-in optical sensors for the azimuth direction, and said altitude sensor unit incorporating two separate, built-in optical sensors for the altitude direction which both are joined to each other in an L shape across the optical axis extending from the concave mirror to the first focal point of the oval mirror, wherein the drive mechanism is controlled by signals from the sensor mechanism for constantly directing the sunlight reflected on the concave mirror to the first focal point of the oval mirror.

8. A sunlight collecting system according to claim 4, wherein each heliostat includes: a drive mechanism for rotating the concave mirror in both altitude and azimuth directions; and a sensor mechanism which comprises a direction sensor unit and an altitude sensor unit, said direction sensor unit incorporating two separate, built-in optical sensors for the azimuth direction, and said altitude sensor unit incorporating two separate, built-in optical sensors for the altitude direction which both are joined to each other in an L shape across the optical axis extending from the concave mirror to the first focal point of the oval mirror, wherein the drive mechanism is controlled by signals from the sensor mechanism for constantly directing the sunlight reflected on the concave mirror to the first focal point of the oval mirror.

9. A sunlight collecting system according to claim 5, wherein the direction and altitude sensors in the sensor mechanism are formed as thin as possible in relation to the sunlight.

10. A sunlight collecting system according to claim 6, wherein the direction and altitude sensors in the sensor mechanism are formed as thin as possible in relation to the sunlight.

11. A sunlight collecting system according to claim 7, wherein the direction and altitude sensors in the sensor mechanism are formed as thin as possible in relation to the sunlight.

12. A sunlight collecting system according to claim 8, wherein the direction and altitude sensors in the sensor mechanism are formed as thin as possible in relation to the sunlight.

* * * * *